(12) United States Patent
Kimura

(10) Patent No.: US 10,373,582 B2
(45) Date of Patent: Aug. 6, 2019

(54) DISPLAY CONTROL DEVICE AND CONTROL METHOD THEREWITH

(71) Applicant: NEC Display Solutions, Ltd., Tokyo (JP)

(72) Inventor: Tatsuo Kimura, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 102 days.

(21) Appl. No.: 15/506,221

(22) PCT Filed: Oct. 24, 2014

(86) PCT No.: PCT/JP2014/078312
§ 371 (c)(1),
(2) Date: Feb. 23, 2017

(87) PCT Pub. No.: WO2016/063408
PCT Pub. Date: Apr. 28, 2016

(65) Prior Publication Data
US 2018/0218659 A1    Aug. 2, 2018

(51) Int. Cl.
*G09G 5/00* (2006.01)
*G09G 5/18* (2006.01)
(Continued)

(52) U.S. Cl.
CPC ............. *G09G 5/005* (2013.01); *G09G 5/00* (2013.01); *G09G 5/18* (2013.01); *G09G 5/393* (2013.01);
(Continued)

(58) Field of Classification Search
CPC .. H04N 13/341; H04N 13/194; H04N 13/398; H04N 13/139; H04N 21/816;
(Continued)

(56) References Cited

U.S. PATENT DOCUMENTS 6,014,126 A * 1/2000 Nishihara ............... G09G 5/006
345/3.2
6,747,640 B2 * 6/2004 Okuno .................. G06T 3/4007
345/213
(Continued)

FOREIGN PATENT DOCUMENTS

JP    H 09-247574 A    9/1997
JP    2000-206951 A    7/2000
(Continued)

OTHER PUBLICATIONS

Japanese Office Action dated Jun. 5, 2018 with an English translation thereof.
International Search Report (ISR) (PCT Form PCT/ISA/210), in PCT/JP2014/078312, dated Jan. 20, 2015.

*Primary Examiner* — Sanjiv D. Patel
(74) *Attorney, Agent, or Firm* — McGinn I.P. Law Group, PLLC.

(57) ABSTRACT

Display control device 100 in the present invention includes: memory 101 that stores an image signal input from a signal source; controller 102 that determines the number of output frames based on an input vertical synchronizing signal input from the signal source, the output frames being frames to be displayed on a display in one cycle of the input vertical synchronizing signal, and that determines a dot number in an output horizontal period such that a gap between an output frame line number of a predetermined output frame and the output frame line number of a different output frame in a period corresponding to one cycle of the input vertical synchronizing signal is smaller than a predetermined threshold, the output horizontal period being one cycle of an output horizontal synchronizing signal, the output frame line number being the number of output horizontal periods corresponding to the output frame; and output section 103 that reads the image signal from storage 101 depending on (Continued)

the dot number determined by controller 102, and that outputs the read image signal on the display.

7 Claims, 4 Drawing Sheets

(51) Int. Cl.
*H04N 7/01* (2006.01)
*G09G 5/393* (2006.01)
*G09G 5/395* (2006.01)
*H04N 13/341* (2018.01)
*H04N 13/398* (2018.01)
*G09G 3/20* (2006.01)
*H04N 13/139* (2018.01)

(52) U.S. Cl.
CPC .......... *G09G 5/395* (2013.01); *H04N 7/0105* (2013.01); *H04N 13/341* (2018.05); *H04N 13/398* (2018.05); *G09G 3/20* (2013.01); *G09G 2340/04* (2013.01); *G09G 2340/0435* (2013.01); *G09G 2360/12* (2013.01); *H04N 13/139* (2018.05)

(58) Field of Classification Search
CPC .... H04N 13/144; H04N 5/04; H04N 21/4305; H04N 21/4307; G09G 2310/08; G09G 2340/10; G09G 2310/0224; G09G 2360/121; G09G 2360/128; G09G 2360/18; G09G 2360/126; G09G 5/006; G09G 5/18

See application file for complete search history.

(56) References Cited

U.S. PATENT DOCUMENTS

| | | | | |
|---|---|---|---|---|
| 2001/0036230 A1* | 11/2001 | Sugiyama | .............. | H04N 7/012 375/240.13 |
| 2002/0015104 A1* | 2/2002 | Itoh | .......... | G09G 3/20 348/459 |
| 2005/0093773 A1* | 5/2005 | Kuroki | ..................... | G09G 3/20 345/30 |
| 2006/0008011 A1* | 1/2006 | Sartor | ................ | H04N 21/4302 375/240.28 |
| 2008/0062185 A1* | 3/2008 | Gong | ........................ | G06F 3/14 345/545 |
| 2011/0285706 A1* | 11/2011 | Daigi | ....................... | H04N 5/45 345/419 |
| 2012/0188448 A1* | 7/2012 | Kimura | .................. | G09G 5/006 348/521 |
| 2012/0306945 A1* | 12/2012 | Lee | ....................... | G09G 3/3413 345/691 |
| 2012/0307141 A1* | 12/2012 | Millet | ................... | G06F 3/1431 348/441 |
| 2013/0093864 A1* | 4/2013 | Yamazaki | ............ | G09G 3/2025 348/55 |

FOREIGN PATENT DOCUMENTS

| | | |
|---|---|---|
| JP | 2002-258824 A | 9/2002 |
| JP | 2002-314950 A | 10/2002 |
| JP | 2004-357295 A | 12/2004 |
| JP | 2005-027195 A | 1/2005 |
| JP | 2005-258237 A | 9/2005 |
| JP | 2012-244426 A | 12/2012 |
| JP | 2014-032159 A | 2/2014 |

* cited by examiner

Figure 5

PRESENT INVENTION IS NOT APPLIED

| INPUT VERTICAL FREQUENCY | DOT CLOCK | REFERENCE OUTPUT HORIZONTAL TOTAL DOT NUMBER | OUTPUT VERTICAL TOTAL LINE NUMBER | TIMES SPEED | OUTPUT FRAME LINE NUMBER (K-TH) | OUTPUT FRAME LINE NUMBER (N-TH) | LINE NUMBER GAP BETWEEN FRAMES |
|---|---|---|---|---|---|---|---|
| IVPRE [Hz] | OCLK [MHz] | OHDEF [dots] | OVTOL [lines] | N | OVFRM [lines] | OVFRM [lines] | OVGAP [lines] |
| 23.9 | 297 | 2200 | 5648.54 | 5 | 1130 | 1129 | 1 |
| 23.92 | 297 | 2200 | 5643.81 | 5 | 1129 | 1128 | 1 |
| 23.94 | 297 | 2200 | 5639.1 | 5 | 1128 | 1128 | 0 |
| 23.96 | 297 | 2200 | 5634.39 | 5 | 1127 | 1127 | 0 |
| 23.98 | 297 | 2200 | 5629.69 | 5 | 1126 | 1126 | 0 |
| 24 | 297 | 2200 | 5625 | 5 | 1125 | 1125 | 0 |
| 24.02 | 297 | 2200 | 5620.32 | 5 | 1125 | 1121 | 4 |
| 24.04 | 297 | 2200 | 5615.64 | 5 | 1124 | 1120 | 4 |
| 24.06 | 297 | 2200 | 5610.97 | 5 | 1123 | 1119 | 4 |
| 24.08 | 297 | 2200 | 5606.31 | 5 | 1122 | 1119 | 3 |
| 24.1 | 297 | 2200 | 5601.66 | 5 | 1121 | 1118 | 3 |

PRESENT INVENTION IS APPLIED

| INPUT VERTICAL FREQUENCY | DOT CLOCK | OUTPUT HORIZONTAL TOTAL DOT NUMBER | OUTPUT VERTICAL TOTAL LINE NUMBER | TIMES SPEED | OUTPUT FRAME LINE NUMBER (K-TH) | OUTPUT FRAME LINE NUMBER (N1-TH) | LINE NUMBER GAP BETWEEN FRAMES |
|---|---|---|---|---|---|---|---|
| IVPRE [Hz] | OCLK [MHz] | OHDEF [dots] | OVTOL [lines] | N | OVFRM [lines] | OVFRM [lines] | OVGAP [lines] |
| 23.9 | 297 | 2192 | 5669.15 | 5 | 1134 | 1134 | 0 |
| 23.92 | 297 | 2196 | 5654.09 | 5 | 1131 | 1131 | 0 |
| 23.94 | 297 | 2200 | 5639.1 | 5 | 1128 | 1128 | 0 |
| 23.96 | 297 | 2200 | 5634.39 | 5 | 1127 | 1127 | 0 |
| 23.98 | 297 | 2200 | 5629.69 | 5 | 1126 | 1126 | 0 |
| 24 | 297 | 2200 | 5625 | 5 | 1125 | 1125 | 0 |
| 24.02 | 297 | 2208 | 5599.95 | 5 | 1120 | 1120 | 0 |
| 24.04 | 297 | 2164 | 5709.06 | 5 | 1142 | 1142 | 0 |
| 24.06 | 297 | 2166 | 5699.05 | 5 | 1140 | 1140 | 0 |
| 24.08 | 297 | 2168 | 5689.06 | 5 | 1138 | 1138 | 0 |
| 24.1 | 297 | 2170 | 5679.1 | 5 | 1136 | 1136 | 0 |

DISPLAY CONTROL DEVICE AND CONTROL METHOD THEREWITH

TECHNICAL FIELD

The present invention relates to a display control device and a control method therewith.

BACKGROUND ART

As one display technique for a three-dimensional image, there is a frame sequential technique. The frame sequential technique is a technique of alternately displaying a left-eye image and a right-eye image, allowing a stereoscopic image to be visually recognized (see Patent Literature 1 (JP2012-244426A)).

In the frame sequential technique, a set of continuous left-eye images and right-eye images is recognized as a stereoscopic image, and therefore, for example, in the case where an image signal has 1080/60p, the left-eye image and the right-eye image are alternately displayed for each frame at 120 Hz, which is twice 60 Hz (two-time speed).

When the image is displayed at a two-time frame rate in the case of image signals of 1080/30p and 1080/24p, the left-eye image and the right-eye image are alternately displayed at 60 Hz and 48 Hz, respectively. In this case, a long frame drawing time causes a phenomenon called a cross talk in which, at the time of displaying an image for one eye, an image for the other eye appears remains displayed. Therefore, in the case of the image signals of 1080/30p and 1080/24p, the display is performed at a four-time speed and a five-time speed, respectively, and the left-eye image and the right-eye image are alternately displayed at 120 Hz. Thereby, the occurrence of the cross talk is prevented.

By the way, some image display devices include frame memories that are used for an image process such as a scaling process. In such an image display device, the input image signal for the three-dimensional image is separated into an image signal for the left-eye image and an image signal for the right-eye image, and they are temporarily stored in the frame memory. The image signal for the left-eye image and the image signal for the right-eye image that are stored in the frame memory are alternately read and displayed at a regular timing, so that the frame sequential technique is actualized.

In the image display device including the frame memory, writing the image signal is performed at a timing (input synchronizing timing) synchronized with a synchronizing signal (input vertical synchronizing signal) that is input. On the other hand, reading the image signal is performed at a timing (output synchronizing timing) synchronized with a synchronizing signal (output vertical synchronizing signal) that is generated from a fixed clock in the image display device. Accordingly, the input synchronizing timing and the output synchronizing timing are asynchronous.

In the case where the input synchronizing timing and the output synchronizing timing are asynchronous, a phenomenon (passing phenomenon) sometimes occurs in which the read address passes the write address. If the passing phenomenon occurs, previous frames relative to display target frames are displayed after the passing phenomenon has occurred. Further, if the passing phenomenon occurs, the read order between the image signal for the left-eye image and the image signal for the right-eye image is sometimes reversed, because the left-eye image and the right-eye image are alternately displayed in the frame sequential technique.

Hence, in the frame sequential technique, the output vertical synchronizing signal is generated based on the input vertical synchronizing signal, and the timings of the writing and the reading are adjusted. Thereby, a control by which the passing phenomenon does not occur is performed. Such a control is called a synchronous mode control.

In the synchronous mode control, a generation counter to generate the output vertical synchronizing signal is reset by the input vertical synchronizing signal. When the generation counter is reset, a pulse signal is produced, and the output vertical synchronous signal is generated. Thereby, the start timings of the writing and the reading are adjusted, thus ensuring that the passing phenomenon does not occur. Incidentally, a control in which the output vertical synchronizing signal is not reset by the input vertical synchronizing signal and reading is performed using the output vertical synchronizing signal generated from the fixed clock in the image display device is called as an asynchronous mode control.

CITATION LIST

Patent Literature

Patent Literature 1: JP2012-244426A

SUMMARY OF INVENTION

Technical Problem

As described above, in the frame sequential technique, the image signal is output at a speed that is a predetermined number times the frame rate of the image signal (frame sequential output). In the following, the description will be made using of an example in which the image signal is output at five times the frame rate.

In the synchronous mode control, it is necessary to divide one cycle of the input vertical synchronizing signal into five, for quintupling the frame rate. In the synchronous mode control, the output vertical synchronizing signal is generated using the input vertical synchronizing signal, and the division of the one cycle of the input vertical synchronizing signal into five divisions is performed by designating the output line number per frame.

For example, suppose that the input image signal has 1080/24p, the frequency of the input horizontal synchronizing signal is 27 KHz and the frequency of the input vertical synchronizing signal is 23.976 Hz. Incidentally, for a general image signal of 1080/24p (the dot number of the valid image display region is 1920 dots in the horizontal direction and is 1080 dots in the vertical direction), 74.25 MHz is used as the input dot clock. However, here, as the image signal for the three-dimensional image, the input dot clock has a double value, that is, 148.5 MHz, and the image signal for the left-eye image (the dot number of the valid image display region is 1920 dots in the horizontal direction and is 1080 dots in the vertical direction) and the image signal for the right-eye image (the dot number of the valid image display region is 1920 dots in the horizontal direction and is 1080 dots in the vertical direction) are input in a one-frame period when the input dot clock has 74.25 MHz. Further, it is assumed that an output horizontal total dot number of 2200 and an output dot clock of 297 MHz are adopted and the frame sequential output is performed at 1080/120p. Incidentally, the dot clock is the inverse number of a time that corresponds to a period of one dot (one pixel) of the image signal. Further, the output horizontal total dot number is the dot number (the dot number on one line) corresponding to one cycle of a horizontal synchronizing signal (output horizontal synchronizing signal). In this case, the line number corresponding to one cycle of the input vertical synchronizing signal, that is, the total number of the lines in the five frames that correspond to one cycle of the input vertical synchronizing signal (output vertical total line number) is $(297 \times 10^6 \pm 2200) \div 23.976 = 5630.63$. Since the input vertical synchronizing signal and the output horizontal synchronizing signal are asynchronous, the actual output vertical total line number is 5630 or 5631.

In the case of quintupling the frame rate, the output vertical total line number is divided into five. In this case, it is necessary that five times the output line number per frame be equal to or larger than the output vertical total line number (5631).

FIG. 1A is a diagram showing the input vertical synchronizing signal and the output vertical synchronizing signal in the case where five times the output line number per frame is smaller than the output vertical total line number.

As shown in FIG. 1A, the generation counter to generate the output vertical synchronizing signal is reset at an interval that corresponds to the output line number per frame that results from dividing the output vertical total line number into five. Thereby, it is possible to generate the output vertical synchronizing signal that results from dividing one cycle of the input vertical synchronizing signal into five.

Here, suppose that the generation counter is reset and the output vertical synchronizing signal rises at time t1 when a time that corresponds to the read of the image signal for the fifth frame has elapsed since the time when the image signal for the fourth frame was read. In the case where five times the output line number per frame is smaller than the output vertical total line number, the rising of the output vertical synchronizing signal occurs in response to the rising of the input vertical synchronizing signal, at time t2 when the input vertical synchronizing signal rises after time t1. Thus, in the case where five times the output line number per frame is smaller than the output vertical total line number, a double pulse in which the output vertical synchronizing signal successively rises is generated. That is, one cycle of the input vertical synchronizing signal is divided not into five but into six. Accordingly, it is necessary that five times the output line number per frame be equal to or larger than the output vertical line number.

In the case of quintupling the frame rate, the five-division of the output vertical total line number results in $5630.63 \div 5 = 1126.125$. If the output line number per frame is 1126, this is not preferable because of $1126 \times 5 = 5630 < 5631$. If the output line number per frame is 1127, $1127 \times 5 = 5635 > 5631$ holds, and therefore, it is determined that the output line number per frame is 1127. That is, it is preferable that the output line number per frame is the value, after the value that results from dividing the output vertical total line number into five, that is rounded up to an integer.

Here, when the output line number per frame is 1127, the generation counter is reset at an interval corresponding to 1127 lines, and the output vertical synchronizing signal rises until the fourth frame. However, as shown in FIG. 1B, for the fifth frame, the rising of the output vertical synchronizing signal occurs in response to the rising of the input vertical synchronizing signal, before the elapse of a period that is correspond to reading the image signal for the 1127 lines. Therefore, the line number of the fifth frame becomes 1122 or 1123, and there is a gap of up to five lines between the frames. There is a problem in which a gap of five lines between the frames produces the vibration in the up-down direction on the display image and deteriorates the display quality of the image.

An object of the present invention is to provide a display control device and a control method therewith that make it possible to prevent the deterioration in the display quality of the image.

Solution to Problem

For achieving the above object, a display control device in the present invention includes:

a storage that stores an image signal input from a signal source;

a controller that determines the number of output frames based on an input vertical synchronizing signal input from the signal source, the output frames being frames to be displayed on a display in one cycle of the input vertical synchronizing signal, and that determines a dot number in an output horizontal period such that a gap between an output frame line number of a predetermined output frame and the output frame line number of a different output frame in a period corresponding to one cycle of the input vertical synchronizing signal is smaller than a predetermined threshold, the output horizontal period being one cycle of an output horizontal synchronizing signal, the output frame line number being the number of output horizontal periods corresponding to the output frame; and an output section that reads the image signal from said storage depending on the dot number determined by said controller, and that outputs the read image signal on the display.

For achieving the above object, a control method in the present invention is a control method with a display control device including:

storing an image signal input from a signal source;

determining the number of output frames based on an input vertical synchronizing signal input from the signal source, the output frames being frames to be displayed on a display in one cycle of the input vertical synchronizing signal, and determining a dot number in an output horizontal period such that a gap between an output frame line number of a predetermined output frame and the output frame line number of a different output frame in a period corresponding to one cycle of the input vertical synchronizing signal is smaller than a predetermined threshold, the output horizontal period being one cycle of an output horizontal synchronizing signal, the output frame line number being the number of output horizontal periods corresponding to the output frame; and reading the stored image signal depending on the determined dot number, and outputting the read image signal on the display.

Advantageous Effect of Invention

According to the present invention, it is possible to prevent deterioration in the display quality of the image.

BRIEF DESCRIPTION OF DRAWINGS

FIG. 5 is a diagram showing a gap in output line number between frames in the case where the present invention is applied and a gap in output line number between frames in the case where the present invention is not applied.

DESCRIPTION OF EMBODIMENTS

Hereinafter, modes for carrying out the present invention will be described with reference to the drawings.

First Exemplary Embodiment

Figure 2:
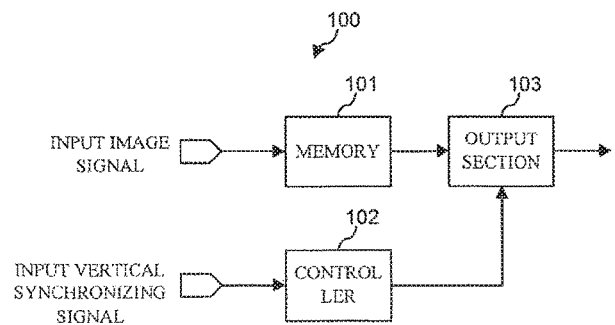
FIG. 2 is a block diagram showing the configuration of a display control device in a first exemplary embodiment.

FIG. 2 is a block diagram showing the configuration of display control device 100 in a first exemplary embodiment.

Display control device 100 shown in FIG. 2 includes memory 101, controller 102, and output section 103.

Figure 1A:
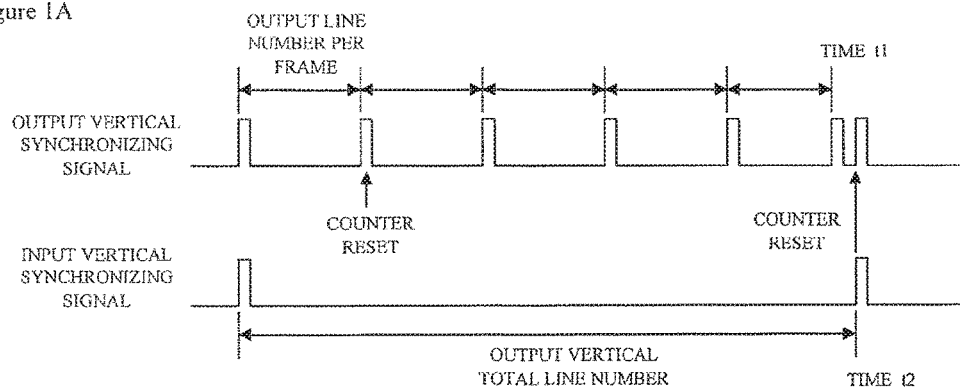
FIG. 1A is a diagram showing an example of an input vertical synchronizing signal and an output vertical synchronizing signal in a synchronous mode control.
Figure 1B:
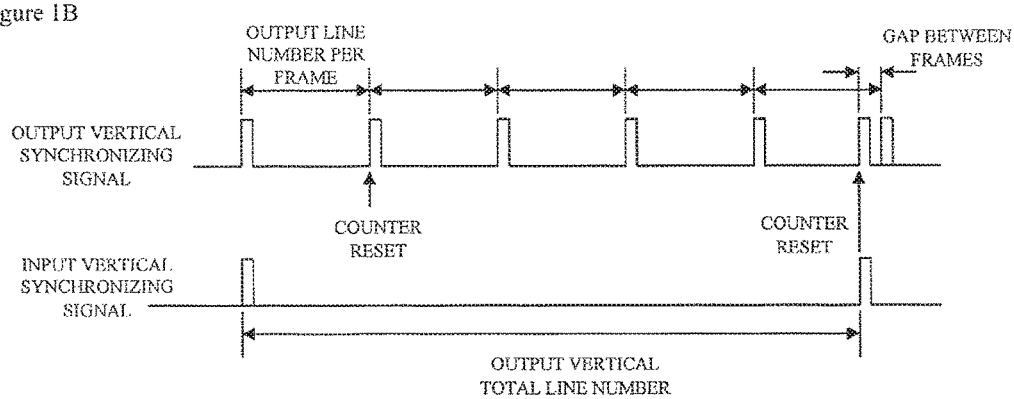
FIG. 1B is a diagram showing an example of the input vertical synchronizing signal and the output vertical synchronizing signal in the synchronous mode control.

Memory 101 is an example of the storage. Memory 101 stores an image signal (input image signal) input from a signal source that is not illustrated in FIG. 1.

Based on an input vertical synchronizing signal input from the signal source, controller 102 determines the frame rate in an image display, that is, the number of output frames that are frames to be displayed on a display in one cycle of the input vertical synchronizing signal. Then, when an output frame line number is defined as the number of output horizontal periods that correspond to the output frame and each of which is one cycle of an output horizontal synchronizing signal, controller 102 determines the dot number in the output horizontal period, such that the gap between the output frame line number of a predetermined output frame and the output frame line number of a different output frame in a period corresponding to one cycle of the input vertical synchronizing signal is equal to or smaller than a predetermined threshold.

Output section 103 reads the image signal from memory 101 depending on the dot number determined by controller 102, and outputs the read image signal on the display.

Thus, in the exemplary embodiment, display control device 100 includes memory 101 that stores the image signal input from the signal source, controller 102, and output section 103. Based on the input vertical synchronizing signal input from the signal source, controller 102 determines the number of the output frames that are frames to be displayed on the display in one cycle of the input vertical synchronizing signal. Then, when the output frame line number is defined as the number of output horizontal periods that correspond to the output frame and each of which is one cycle of the output horizontal synchronizing signal, controller 102 determines the dot number in the output horizontal period, such that the gap between the output frame line number of the predetermined output frame and the output frame line number of the different output frame in the period corresponding to one cycle of the input vertical synchronizing signal is smaller than the predetermined threshold. Output section 103 reads the image signal from memory 101 depending on the dot number determined by controller 102, and outputs the read image signal on the display.

Therefore, since the gap in the output frame line number of each output frame becomes equal to or smaller than the predetermined threshold, it is possible to prevent any vibration in the up-down direction on the display image from being produced, and to prevent deterioration in the display quality of the image.

Second Exemplary Embodiment

Figure 3:
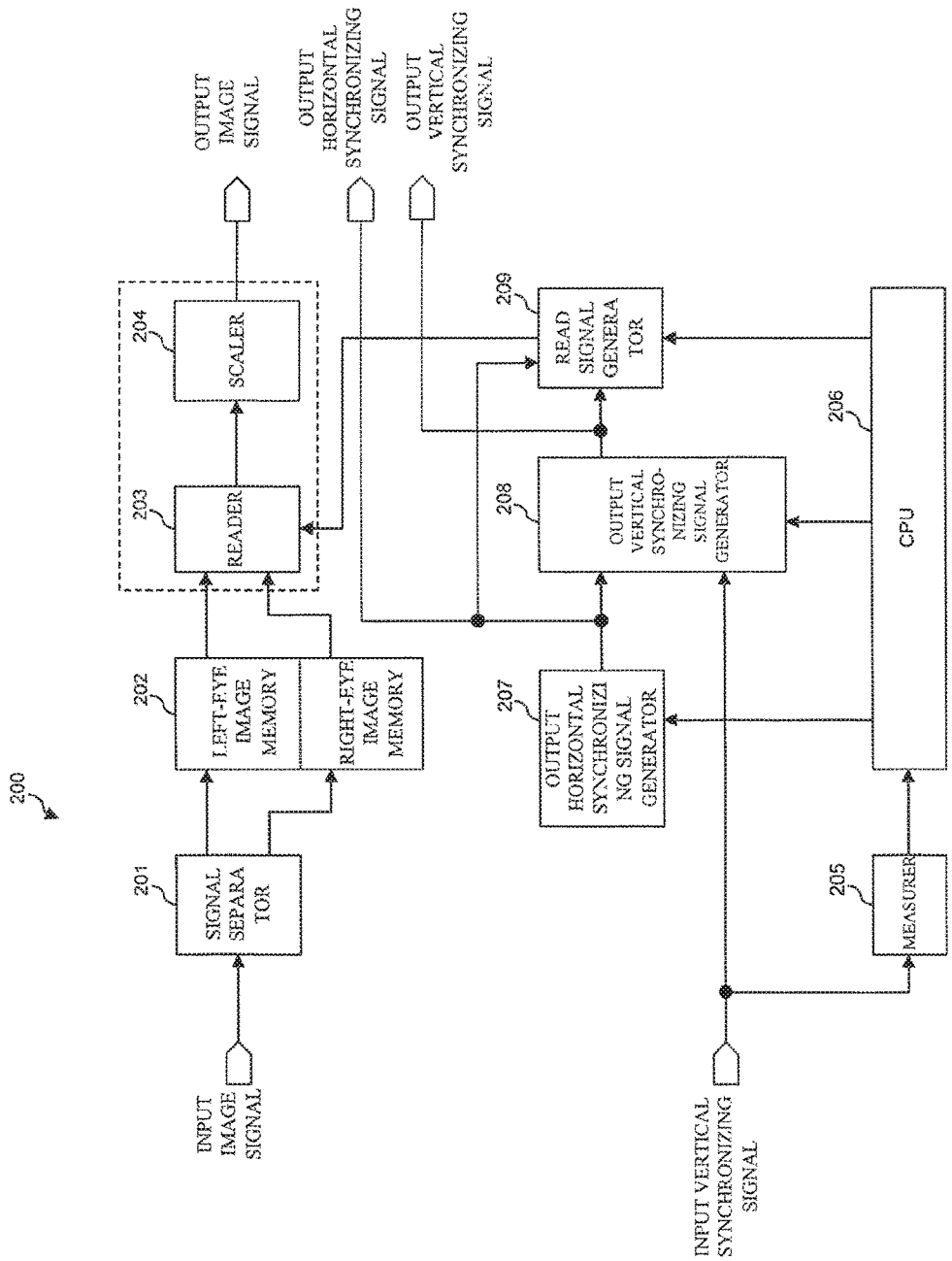
FIG. 3 is a block diagram showing the configuration of a display control device in a second exemplary embodiment.

FIG. 3 is a block diagram showing the configuration of image display device 200 in a second exemplary embodiment.

Image display device 200 shown in FIG. 3 includes signal separator 201, frame memory 202, reader 203, scaler 204, measurer 205, CPU (Central Processing Unit) 206, output horizontal synchronizing signal generator 207, output vertical synchronizing signal generator 208, and read signal generator 209. Frame memory 201 is an example of the storage. Reader 203 is an example of the output section. CPU 206 is an example of the controller. Incidentally, scaler 204 may be included in the output section. Further, measurer 205, output horizontal synchronizing signal generator 207, output vertical synchronizing signal generator 208 and read signal generator 209 may be included in the controller.

Signal separator 201 separates an image signal for a three-dimensional image input from a signal source that is not illustrated in FIG. 3, into an image signal for a left-eye image and an image signal for a right-eye image signal, and outputs them to frame memory 202.

Frame memory 202 stores each of the image signal for the left-eye image and the image signal for the right-eye image signal that are output from signal separator 201.

Reader 203 reads the image signal stored in frame memory 202, and outputs the read image signal to scaler 204.

Scaler 204 performs an image process such as a scaling process, on the image signal output from reader 203, and outputs the image signal (output image signal) after the image process, on a display that is not illustrated in FIG. 3.

Measurer 205 measures the frequency of the vertical synchronizing signal (input vertical synchronizing signal) input from the signal source, and outputs the measurement result to CPU 206.

Based on the measurement result from measurer 205, CPU 206 determines the frame rate in image display, that is, the number of output frames that are frames to be displayed on a display in one cycle of the input vertical synchronizing signal. When the output frame line number is defined as the number of output horizontal periods that correspond to each output frame and each of which is one cycle of the output horizontal synchronizing signal, CPU 206 determines the dot number (output horizontal total dot number) in the output horizontal period, such that the gap between the output frame line number of a predetermined output frame and the output frame line number of a different output frame in a period corresponding to one cycle of the input vertical synchronizing signal is equal to or smaller than a predetermined threshold.

CPU 206 outputs (gives notice) the determined output horizontal total dot number to output horizontal synchronizing signal generator 207. Further, CPU 206 outputs (gives notice) the output frame line number of each of the frames, to output horizontal synchronizing signal generator 207. Further, CPU 206 outputs (gives notice) the determined frame rate to read signal generator 209.

Output horizontal synchronizing signal generator 207 generates a horizontal synchronizing signal (output horizontal synchronizing signal) having a frequency corresponding to the output horizontal total dot number given from CPU 206. Output horizontal synchronizing signal generator 207 outputs the generated output horizontal synchronizing signal, to output vertical synchronizing signal generator 208, reader 209 and the display.

Output vertical synchronizing signal generator 208 generates an output vertical synchronizing signal corresponding to the output vertical period of each frame, based on the input vertical synchronizing signal, the output frame line numbers of the frames given from the CPU 206, and the output horizontal synchronizing signal. Output vertical synchronizing generator 208 outputs the generated output vertical synchronizing signal, to read signal generator 209 and the display.

Read signal generator 209 generates a read signal to control reading the image signal stored in frame memory 202, based on the frame rate given from CPU 206, the output vertical synchronizing signal and the output horizontal synchronizing signal. Read signal generator 209 outputs the generated read signal to reader 203.

Figure 4:
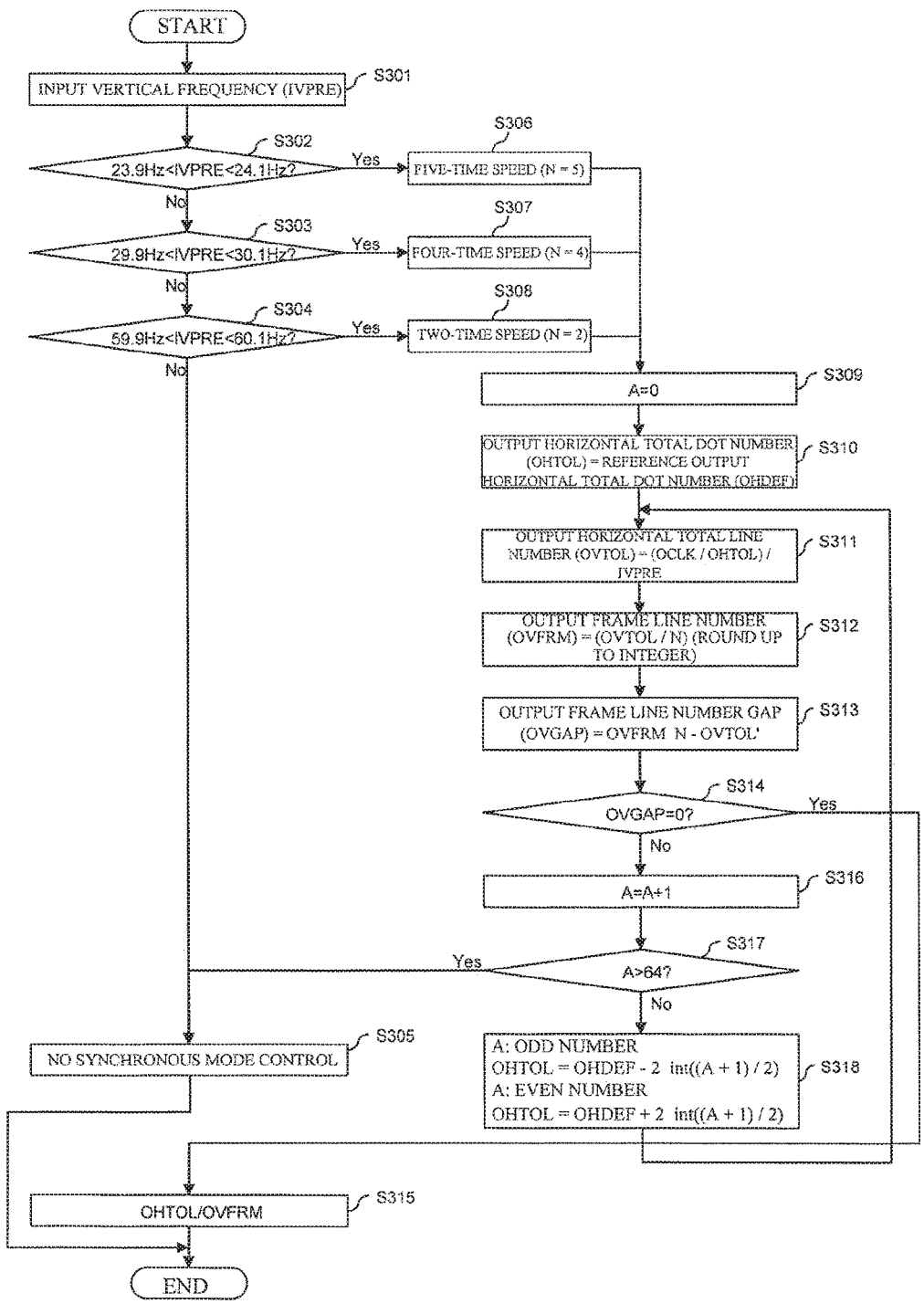
FIG. 4 is a flowchart showing an operation of the display control device shown in FIG. 3.

Next, an operation of display control device 200 will be described with reference to a flowchart shown in FIG. 4.

The image signal (input image signal) for a three-dimensional image and the vertical synchronizing signal (input vertical synchronizing signal) are input from an external signal source.

Signal separator 201 separates the input image signal into the image signal for the left-eye image and the image signal for the right-eye image, and outputs them to frame memory 202.

Frame memory 202 stores each of the image signal for the left-eye image and the image signal for the right-eye image that are output from signal separator 201.

Measurer 205 measures vertical frequency IVPRE of the input vertical synchronizing signal, and outputs the measurement result to CPU 206.

CPU 206 determines the frame rate in image display, based on the measurement result of vertical frequency IVPRE. Specifically, first, CPU 206 determines whether 23.9 Hz<vertical frequency IVPRE<24.1 Hz is satisfied (step S302).

In the case of determining that 23.9 Hz<vertical frequency IVPRE<24.1 Hz is not satisfied (step S302: No), CPU 206 determines whether 29.9 Hz<vertical frequency IVPRE<30.1 Hz is satisfied (step S303).

In the case of determining that 29.9 Hz<vertical frequency IVPRE<30.1 Hz is not satisfied (step S303: No), CPU 206 determines whether 59.9 Hz<vertical frequency IVPRE<60.1 Hz is satisfied (step S304).

In the case of determining that 59.9 Hz<vertical frequency IVPRE<60.1 Hz is not satisfied (step S304: No), CPU 206 determines not to perform the synchronous mode control (step S305), and ends the process.

In the case of determining that 23.9 Hz<vertical frequency IVPRE<24.1 Hz is satisfied (step S302: Yes), CPU 206 determines that the frame rate in image display is a five-time speed (step S306). That is, CPU 206 determines that number N of the output frames is five.

In the case of determining that 29.9 Hz<vertical frequency IVPRE<30.1 Hz is satisfied (step S303: Yes), CPU 206 determines that the frame rate in image display is a four-time speed (step S307). That is, CPU 206 determines that number N of the output frames is four.

In the case of determining that 59.9 Hz<vertical frequency IVPRE<60.1 Hz is satisfied (step S304: Yes), CPU 206 determines that the frame rate in image display is a two-time speed (step S308). That is, CPU 206 determines that number N of the output frames is two.

After the process of step S306, step S307 or step S308, CPU 206 sets variable A to 0 (step S309).

Next, CPU 206 determines that output horizontal total dot number OHTOL is a previously determined reference output horizontal total dot number (OHDEF) (step S310). Here, the reference output horizontal total dot number is previously determined based on the display resolution of a display element such as, for example, a liquid crystal panel or a DMD (Deigital Micromirror Device) that is included in the display.

Next, CPU 206 calculates output vertical total line number OVTOL that is the total number of lines to be read in one cycle of the input vertical synchronizing signal (step S311). Specifically, CPU 206 calculates output vertical total line number OVTOL based on dot clock OCLK (unit: Hz), output horizontal total dot number OHTOL and vertical frequency IVPRE (unit: Hz), using the following Formula 1.

$$OVTOL=(OCLK/OHTOL)/IVPRE \quad \text{Formula 1}$$

Next, CPU 206 calculates output frame line number per frame OVFRM, using the following formula (step S312).

$$OFVRM=(OVTOL/N)\text{(round up to an integer)} \quad \text{Formula 2}$$

As described above, in the case of displaying N frames in one cycle of the input vertical synchronizing signal, it is preferable that the output frame line number per frame is the value, after the value that results from dividing the output vertical total line OVTOL into N, that is rounded up to an integer.

Next, CPU 206 calculates output frame line number gap OVGAP that is the gap in output frame line number among the N output frames, using the following Formula 3 (step S313).

$$OVGAP=OVFRM\times N-OVTOL' \quad \text{Formula 3}$$

Here, OVTOL' in Formula 3 is the value after output vertical total line number OVTOL calculated using Formula 1 is rounded up to an integer.

Next, CPU 206 determines whether output frame line number gap OVGAP is smaller than a predetermined threshold, for example, whether output frame line number gap OVGAP is smaller than 1 (that is, whether OVGAP is 0) (step S314). Here, the predetermined threshold is set to a value allowing deterioration in the display quality of the image, for example, vibration that is produced on the display image, to be prevented.

In the case of determining that output frame line number gap OVGAP is 0 (smaller than the predetermined threshold) (step S314: Yes), CPU 206 gives notice of output horizontal total dot number OHTOL determined in step S310, to output horizontal synchronizing signal generator 207. Further, CPU 206 gives notice of output frame line number OVFRM calculated in step S312, to output vertical synchronizing signal generator 208 (step S315). Further, CPU 206 gives notice of the frame rate in image display, to read signal generator 209.

In the case of determining that output frame line number gap OVGAP is not 0 (larger than the predetermined threshold) (step S314: No), CPU 206 adds 1 to variable A (step S316). Incidentally, in the case where output frame line number gap OVGAP is the same as the predetermined threshold, which determination is made is previously set based on whether the vibration to be produced on the display image, or the like is produced.

Next, CPU 206 determines whether variable A is larger than 64 (step S317).

In the case of determining that variable A is not larger than 64 (step S317: No), CPU 206 adds or subtracts a predetermined number for output horizontal total dot OHTOL (step S318), and returns to the process of step S311. Specifically, in the case where variable A is an odd number, CPU 206 calculates output horizontal total dot number OHTOL, based on the following Formula 4. Further, in the case where variable A is an even number, CPU 206 calculates output horizontal total dot number OHTOL, based on the following Formula 5.

$$OHTOL = OHDEF - 2 \times \mathrm{int}((A+1)/2) \qquad \text{Formula 4}$$

$$OHTOL = OHDEF + 2 \times \mathrm{int}((A+1)/2) \qquad \text{Formula 5}$$

As is clear from Formula 4 and Formula 5, CPU 206 calculates output horizontal total dot number OHTOL, by gradually adding or subtracting 2, 4, . . . 64 for reference output horizontal total dot number OHDEF. Then, CPU 206 repeats the processes of step S311 to step S318, until output frame line number gap OVGAP becomes 0.

Incidentally, in the case of determining that variable A is larger than 64 (step S317: Yes), CPU 206 proceeds to the process of step S305. It is necessary that output horizontal total dot number OHTOL is not equal to or smaller than the dot number in the horizontal direction of a valid image display region indicated in the image signal. Therefore, when the value to be subtracted from reference output horizontal total dot number OHDEF becomes larger than the predetermined value, CPU 206 determines not to perform the synchronous mode control, and ends the process. In this case, it is preferable that CPU 206 determines to perform an asynchronous mode control and performs a process corresponding to the asynchronous mode control.

When output horizontal total dot number OHTOL is given from CPU 206, output horizontal synchronizing signal generator 207 generates the output horizontal synchronizing signal having a cycle corresponding to an output horizontal period equivalent to output horizontal total dot number OHTOL. Then, output horizontal synchronizing signal generator 207 outputs the generated output horizontal synchronizing signal, to the display, output vertical synchronizing signal generator 208 and read signal generator 209.

Output vertical synchronizing signal generator 208 generates the output vertical synchronizing signal, based on the input vertical synchronizing signal, the output horizontal synchronizing signal and output frame line number OVFRM. Then, output vertical synchronizing signal generator 208 outputs the generated output vertical synchronizing signal, to the display and read signal generator 209.

Read signal generator 209 generates the read signal based on the horizontal synchronizing signal and the output vertical synchronizing signal, and outputs the generated read signal to reader 203. Reader 203 reads the image signal from frame memory 202, based on the read signal. Thereby, depending on the dot number (output horizontal total dot number OHTOL) determined by CPU 206, it is possible to read the image signal corresponding to output frame line number OVFRM of each output frame.

Further, read signal generator 209 controls reading of the image signal for the left-eye image and the image signal for the right-eye image, based on the frame rate given from CPU 206.

FIG. 5 is a diagram showing a gap in output frame line number of each output frame in the case where the present invention is applied and a gap in output frame line number of each output frame in the case where the present invention is not applied.

In FIG. 5, OUTPUT FRAME LINE NUMBER (K-TH) shows the output line number of the output frames that are of the N output frames to be displayed in one cycle of the input vertical synchronizing signal and that are displayed first to N−1-th. Here, K=1, 2, . . . N−1 holds. Further, OUTPUT FRAME LINE NUMBER (N-TH) shows the output line number of the frame that is displayed N-th.

Ordinarily, the frequency of the input vertical synchronizing signal varies depending on the machine type of the signal source and the like. By applying the present invention, it is possible to make the gap in output line number between the frames smaller than a predetermined threshold (smaller than 1, in FIG. 5), regardless of the frequency of the input vertical synchronizing signal.

Thus, in the exemplary embodiment, display control device 200 includes frame memory 202 that stores the image signal input from the signal source, CPU 206, and read circuit 203. Based on the input vertical synchronizing signal input from the signal source, CPU 206 determines the number of the output frames that are frames to be displayed on the display in one cycle of the input vertical synchronizing signal. Then, when the output frame line number is defined as the number of output horizontal periods that correspond to the output frame and each of which is one cycle of the output horizontal synchronizing signal, CPU 206 determines the dot number in the output horizontal period, such that the gap between the output frame line number of the predetermined output frame and the output frame line number of the different output frame in the period corresponding to one cycle of the input vertical synchronizing signal is smaller than the predetermined threshold. Read circuit 203 reads the image signal from frame memory 202, depending on the dot number determined by CPU 206, and outputs the read image signal on the display.

Therefore, since the gap in the output frame line number of each output frame becomes equal to or smaller than the predetermined threshold, it is possible to prevent vibration in the up-down direction on the display image from being produced, and prevent the deterioration in the display quality of the image.

In the embodiment, output horizontal total dot number OHTOL is adjusted in a range of ±64 relative to reference output horizontal total dot number OHDEF, but the present invention is not limited to this. In the case of the subtraction from reference output horizontal total dot number OHDEF, it is preferable that output horizontal total dot number OHTOL does not become equal to or smaller than the dot number in the horizontal direction of the valid image display region. When the value becomes small, output horizontal total dot number OHTOL exerts an influence on the image in the horizontal direction of the valid image display region. Accordingly, in the case where output horizontal total dot number OHTOL becomes smaller than the dot number in the horizontal direction of the valid image display region, it is preferable that asynchronous mode control be performed instead of synchronous mode control. In the case where output horizontal total dot number OHTOL results from the addition to reference output horizontal total dot number OHDEF, it is preferable that output vertical total line number OVTOL does not become equal to or smaller than the dot number (line number) in the vertical direction of the valid image display region. As can be seen from Formula 1, when the value of output horizontal total dot number OHTOL becomes large, output vertical total line number OVTOL decreases, and exerts an influence on the image in the vertical direction of the valid image display region. Accordingly, in the case where output vertical total line number OVTOL becomes smaller than the dot number (line number) in the vertical direction of the valid image display region, it is preferable that asynchronous mode control be performed instead of synchronous mode control.

The exemplary embodiment has been described with use of the example in which one frame memory 202 is provided and the image signal for the left-eye image and the image signal for the right-eye image are alternately read from frame memory 202. However, for avoiding the passing phenomenon, a plurality of (at least two) frame memories 202 are sometimes provided. In the following, suppose that two frame memories (frame memories 202-1, 202-2) are provided. In this case, in one cycle of the input vertical synchronizing signal, the image signal for the left-eye image and the image signal for the right-eye image are successively read from frame memory 202-1. Then, in the next cycle of the input vertical synchronizing signal, the image signal for the left-eye image and the image signal for the right-eye image are successively read from frame memory 202-2. Such a process for reading image signals for both eyes is called a double speed read.

As described above, output vertical synchronizing signal generating circuit 208 inputs the output vertical synchronizing signal to read signal generating circuit 209. Based on this input, read signal generating circuit 209 generates a left-right discrimination signal indicating whether to read the image signal for the left-eye image or read the image signal for the right-eye image, and inputs the generated left-right discrimination signal to read circuit 203.

Further, CPU 209 gives notice of the frame rate, to read signal generating circuit 209. Based on this notice, read signal generating circuit 209 generates a memory discrimination signal indicating whether to read the image signal from frame memory 202-1 or from frame memory 202-2, and inputs the generated memory discrimination signal to read circuit 203. Specifically, for example, read signal generating circuit 209 outputs the memory discrimination signal at the High level in the case of reading the image signal from one of frame memory 202-1 and frame memory 202-2, and outputs the memory discrimination signal at the Low level in the case of reading the image signal from the other. That is, whether to read the image signal from frame memory 201-1 or read the image signal from frame memory 201-2 is switched by switching the logic level (High/Low) of the memory discrimination signal.

Here, in the case of the two-time read, the memory discrimination signal is a signal to switch Low/High every two output frames, and in the case of the four-time read, the memory discrimination signal is a signal to switch Low/High every four output frames. Meanwhile, in the case of the five-time read, the memory discrimination signal is a signal of four Low output frames and six High output frames, taking into account combining the image signal for the left-eye image and the image signal for the right-eye image.

Based on the left-right discrimination signal and memory discrimination signal output from read signal generating circuit 209, read circuit 203 reads the image signal from each frame memory. Specifically, based on the left-right discrimination signal and the memory discrimination signal, read circuit 203 performs the switching of the frame memory from which the image signal is read, and the switching between reading of the image signal for the left-eye image and reading of the image signal for the right-eye image.

Thus, the invention in the application has been described with reference to the exemplary embodiments, but the present invention is not limited to the above exemplary embodiments. In the configuration and detail of the invention in the application, various modifications that can be understood by those skilled in the art can be made within the scope of the invention in the application.

The invention claimed is:

1. A display control device, comprising:
   a storage that stores an image signal input from a signal source;
   a controller that determines a number of output frames based on an input vertical synchronizing signal input from the signal source, the output frames including frames to be displayed on a display in one cycle of the input vertical synchronizing signal, and that determines a dot number in an output horizontal period such that a gap between an output frame line number of a predetermined output frame and the output frame line number of a different output frame in a period corresponding to one cycle of the input vertical synchronizing signal is smaller than a predetermined threshold, the output horizontal period being one cycle of an output horizontal synchronizing signal, the output frame line number being a number of output horizontal periods corresponding to the output frame; and
   an output section that reads the image signal from said storage depending on the dot number determined by said controller, and that outputs the read image signal on the display.

2. The display control device according to claim 1, wherein said controller calculates an output vertical total line number that is a total number of lines to be read in the one cycle of the input vertical synchronizing signal, based on a dot clock, a frequency of the input vertical synchronizing signal, and a previously determined reference horizontal output total dot number, determines output frame line numbers of the output frames based on the calculated output vertical total line number, and calculates the output vertical total line number again by adding or subtracting a predetermined number for the reference horizontal output total dot number, when the gap between the determined output frame line number of the predetermined output frame and the determined output frame line number of the different output frame is larger than the predetermined threshold.

3. The display control device according to claim 2, wherein said controller gradually increases a value that is added or subtracted for the reference horizontal output total dot number, until the gap between the output frame line number of the predetermined output frame and the output frame line number of the different output frame becomes smaller than the predetermined threshold, and stops the calculation of the output vertical total line number, when a value that is subtracted for the reference horizontal output total dot number becomes larger than a predetermined value.

4. A control method with a display control device, the method comprising:
   storing an image signal input from a signal source;
   determining a number of output frames based on an input vertical synchronizing signal input from the signal source, the output frames including frames to be displayed on a display in one cycle of the input vertical synchronizing signal, and determining a dot number in an output horizontal period such that a gap between an output frame line number of a predetermined output frame and the output frame line number of a different output frame in a period corresponding to one cycle of the input vertical synchronizing signal is smaller than a predetermined threshold, the output horizontal period being one cycle of an output horizontal synchronizing signal, the output frame line number being a number of output horizontal periods corresponding to the output frame; and reading the stored image signal depending on the determined dot number, and outputting the read image signal on the display.

5. The control method according to claim 4, wherein said display control device calculates an output vertical total line number that is a total number of lines to be read in the one cycle of the input vertical synchronizing signal, based on a dot clock, a frequency of the input vertical synchronizing signal and a previously determined reference horizontal output total dot number, determines the output frame line number of each of the output frames based on the calculated output vertical total line number, and calculates the output vertical total line number again by adding or subtracting a predetermined number for the reference horizontal output total dot number, when the gap between the determined output frame line number of the predetermined output frame and the output frame line number of the different output frame is larger than the predetermined threshold.

6. The control method according to claim 5, wherein said display control device gradually increases a value that is added or subtracted for the reference horizontal output total dot number, until the gap between the output frame line number of the predetermined output frame and the output frame line number of the different output frame becomes smaller than the predetermined threshold, and stops the calculation of the output vertical total line number, when a value that is subtracted for the reference horizontal output total dot number becomes larger than a predetermined value.

7. A display control device, comprising:
a processor coupled to a memory storing instructions for executing:
a storage that stores an image signal input from a signal source;
a controller that determines a number of output frames based on an input vertical synchronizing signal input from the signal source, the output frames including frames to be displayed on a display in one cycle of the input vertical synchronizing signal, and that determines a dot number in an output horizontal period such that a gap between an output frame line number of a predetermined output frame and the output frame line number of a different output frame in a period corresponding to one cycle of the input vertical synchronizing signal is smaller than a predetermined threshold, the output horizontal period being one cycle of an output horizontal synchronizing signal, the output frame line number being a number of output horizontal periods corresponding to the output frame; and
an output section that reads the image signal from said storage depending on the dot number determined by said controller, and that outputs the read image signal on the display.

* * * * *